United States Patent [19]

Jacob et al.

[11] Patent Number: 5,026,609
[45] Date of Patent: Jun. 25, 1991

[54] ROAD REPAIR MEMBRANE

[75] Inventors: Thomas R. Jacob, Newark; Leonard A. Stenger, Granville; William E. Uffner, Newark, all of Ohio

[73] Assignee: Owens-Corning Fiberglas Corporation, Toledo, Ohio

[21] Appl. No.: 244,362

[22] Filed: Sep. 15, 1988

[51] Int. Cl.⁵ .................... B32B 11/02; B32B 11/10
[52] U.S. Cl. ........................... 428/489; 404/31; 404/32; 428/290; 428/291
[58] Field of Search .......... 428/489, 290, 291, 40, 428/343, 349, 354, 378; 156/71, 72, 79; 525/289, 54.5; 524/68, 59; 528/63; 404/31, 32, 66; 206/411

[56] References Cited

U.S. PATENT DOCUMENTS

| | | | |
|---|---|---|---|
| 3,741,856 | 6/1973 | Hurst | 428/489 X |
| 3,856,732 | 12/1974 | Bresson et al. | 524/68 |
| 3,900,102 | 8/1975 | Hurst | 206/411 |
| 4,362,586 | 12/1982 | Uffner et al. | 156/71 |
| 4,426,419 | 1/1984 | Uffner et al. | 428/290 |
| 4,440,816 | 4/1984 | Uffner | 428/40 |
| 4,471,094 | 9/1984 | Uffner et al. | 525/289 |
| 4,478,912 | 10/1984 | Uffner et al. | 428/349 |
| 4,485,144 | 11/1984 | Uffner et al. | 428/343 |
| 4,508,770 | 4/1985 | Munchester et al. | 528/63 |
| 4,518,741 | 5/1985 | Uffner et al. | 525/54.5 |
| 4,528,241 | 7/1985 | Uffner et al. | 428/378 |
| 4,537,921 | 8/1985 | Uffner et al. | 524/59 |
| 4,545,699 | 10/1985 | Uffner et al. | 404/31 |
| 4,835,199 | 5/1989 | Fulamura et al. | 525/54.5 |

OTHER PUBLICATIONS

Roadglas System-Owens-Corning Fiberglas Corp., The Engineered Solution to Reflective Cracking, Copyrighted in 1984, p. 5.

*Primary Examiner*—Thomas J. Herbert
*Attorney, Agent, or Firm*—Patrick P. Pacella; Ted C. Gillespie; Robert F. Rywalski

[57] ABSTRACT

Membranes are provided which minimize reflective cracking in the repair of roads. The membrane comprises a reinforcement along with a binder having a high modulus of elasticity and a binder having a low modulus of elasticity. The high modulus binder impregnates the reinforcement and is adhered to the distressed road whereas the low modulus of elasticity material is adhered to the impregnated reinforcement and is used in contact with the subsequently applied asphaltic overlay.

14 Claims, 1 Drawing Sheet

ROAD REPAIR MEMBRANE

TECHNICAL FIELD

The present invention is related to highway maintenance and to the art of road repair membranes, more specifically to asphaltic based road repair membranes. Even yet more particularly, the present invention is directed to a road repair membrane which can be preformed in a factory prior to use or which can be formed in situ, at a job site, and in which membrane will substantially retard reflective cracking.

BACKGROUND ART

Failures in asphalt concrete and cement pavements can result from instability, disintegration of the material, and cracking. Generally, instability and disintegration are results of faulty mix design and/or faulty construction procedures. Cracking, on the other hand, results primarily from thermal and traffic stresses which exceed the breaking strength of the road construction material.

Generally, thermal stresses are generated by changes in atmospheric temperatures which can cause rapid changes in temperature throughout the thickness of the pavement. Such rapid temperature changes, coupled with the fact that the pavement is insufficiently restrained from freely contracting, or expanding, results in stressing of the pavement. These stresses may accumulate to the extent that the strength of the material is exceeded, at which time visible cracking may form. High stresses due to temperature change can be reached in short periods of time, for example, only a few hours. For example, when a road cools rapidly at night, e.g. on the order of 6° F. per hour, the thermal stress in the road can increase from about 10 pounds per square inch at freezing (32° F.) to a value of about 220 pounds per square inch at $-18°$ F.

The additional stressing of the road caused by traffic loading also causes the road to deteriorate. However, in the case of traffic loading, stressing of the pavement occurs at even a much faster rate, typically in milliseconds.

In the repair of deteriorated asphalt concrete roads, one of the most persistent and troublesome problems is the phenomenon of "reflective cracking". This occurs where a new asphalt concrete surface, or "overlay", is applied to an old, cracked road surface, optionally, but typically after filling the cracks with a suitable asphaltic crack filler. After a relatively short period of time, the cracks from the old road will appear in the overlay, above the location of the old cracks. This is known as "reflective cracking," and it occurs because the old cracks propagate by widening or lengthening with sufficient force to tear the new overlay.

It has been determined that merely increasing the overlay thickness does not reduce the overall strain energy release rate or "stress intensity factor" and, thus, does not prevent reflective cracking. For example, increasing the overlay thickness from 1 inch to 3 inches will reduce the thermal stress intensity factor by about 17%, but it may actually increase the traffic stress intensity factor by as much as 50%. Thus, increasing the overlay thickness is relatively immaterial so far as thermal stress is concerned, and the thickness increase actually may be counterproductive because of increasing the traffic stress.

Reflective cracking is due primarily to these same thermal and traffic stresses which occur in the road, particularly those thermal stresses which are generated by the road cooling quickly. Where the thermally stressed road is also subject to traffic loads, crack propagation and reflective cracking is greatly increased, with the resultant rapid deterioration of the newly-applied overlay. Also, any intrusion of water through the reflective cracks will cause further deterioration of the entire road.

Attempts have been made to deal with the reflective cracking problem by providing membranes over the repaired crack prior to the application of the overlay. That is, the cracks were, first of all, filled or sealed with a suitable crack filler and then a reinforcing membrane was formed which spanned the crack. These membranes included a permeable reinforcing mat, typically a fibrous reinforcing mat which could be of glass or organic material such as, for example, polypropylene or other strong fibrous material like the polyesters, for example, PET. In one application technique an asphaltic based binder was applied about the crack, a fibrous glass woven roving was then applied onto the molten binder prior to its solidification and then the woven roving was overcoated with the same binder. In another technique a membrane was employed which included a reinforcing member which had been impregnated with an asphaltic based composition and then one side of that impregnated reinforcing member was coated with an adhesive which was pressure sensitive at ambient temperatures. This membrane was applied, or adhered, to the underlying distressed or cracked pavement by attaching the adhesive portion thereto and then the repair maintenance of the road was completed by overlaying with an asphaltic concrete.

While such approaches have provided improvement, nonetheless reflective cracking remains a problem in the art and there is still a need in the art to provide even more improvement.

DISCLOSURE OF THE INVENTION

Unlike the prior art wherein a single binder was employed, the present invention contemplates the use of a membrane with two different binders and a suitable permeable mat, preferably a fibrous reinforcing mat. The lower portion of the membrane includes the reinforcing mat along with an asphaltic based binder which has a high modulus elasticity. The reinforcement is impregnated with the high modulus of the elasticity material and the impregnated reinforcement is disposed such that the high modulus binder is in contact with the underlying, or distressed pavement. This configuration helps deal with the traffic load problem and reduces the stress intensity, to thereby retard subsequent cracking of the repaired road. The membrane also includes another asphaltic based binder which is applied to the side of the membrane intended for contact with the overlay, i.e. the side opposite that intended for contact with the distressed pavement. This low modulus of elasticity material interacts with the action of the reinforcement and high modulus material to provide highly beneficial results with regard to the retardation of reflective cracking. The low modulus material primarily functions as a slip plane to accommodate shifting of the overlay relative to the pavement and membrane because of thermally induced stresses.

DESCRIPTION OF THE INVENTION INCLUDING THE BEST MODE OF CARRYING IT OUT

The present invention contemplates utilization of a multi-layer, composite membrane which may be either preformed or formed in situ, i.e. on site, and which is interposed between the old, cracked road surface and the newly applied overlay to retard reflective cracking, to retard further deterioration of the old road surface, and to provide a barrier to water intrusion. This laminated membrane may cover the entire surface of the distressed road or it may be locally applied adjacent a single crack in the old road so as to extend longitudinally and laterally beyond the confines of the crack. In either case, the membrane is applied to the old road surface prior to application of a conventional hot mix asphalt overlay.

The multi-ply laminate of the present invention includes two different asphalt based compositions, or binders, each of which has unique and important modulus of elasticity characteristics. The binder layers are of variant moduli of elasticity. More specifically, the road repair composite of the present invention includes a first binder layer of high modulus of elasticity, a permeable reinforcing mat impregnated with this first binder, and a second binder layer of substantially lower modulus of elasticity coated on one side of the impregnated mat. The high modulus binder is in contact with the distressed pavement and the low modulus with the overlay.

Generally, the high modulus binder layer is applied in a molten state directly to the old distressed road surface, and the mat is applied thereto while the binder layer is still molten, so that the high modulus binder impregnates the mat, i.e. the mat is embedded in, and substantially enveloped by, the high modulus material. After the high modulus binder-mat combination has solidified by cooling, the binder layer of lower modulus material is applied on top of the impregnated mat. Finally, hot mix asphalt overlay is applied over the composite membrane. Of course, a suitable crack filler is used to first fill the cracks which are to be repaired.

If desired, the composite binder can be prefabricated prior to its application to the old distressed road surface. This is generally accomplished by, for example, dipping the permeable reinforcing mat into a molten bath of the high modulus material to effect impregnation and then, after cooling, applying a layer of the low modulus of the elasticity binder to one side of the thus formed membrane. Whether formed on site or prefabricated the thickness of the portion of the membrane which includes the reinforcing mat impregnated with the high modulus of the elasticity material will typically be on the order of about 1/16" and the separate layer of the low modulus of elasticity material will generally have about the same thickness. Typically, the entire membrane, including both binders and the reinforcement, has a thickness on the order of about one quarter inch. Because of the relatively high modulus of the elasticity of the high modulus material, prefabricated products of the type described above are generally stiff, non-rollable and are not necessarily convenient to handle. Consequently, efficiencies, depending on labor costs, can be attained by forming the membrane in situ, that is, on site. In order to ensure that the interstices of the permeable mat are saturated or impregnated with the high modulus of elasticity binder, it may be desirable, when forming the membrane on site, to apply an additional layer of the high modulus of elasticity binder to the embedded mat prior to the application of the overlayer of the low modulus of elasticity material.

The permeable mats which are employed may be formed of glass, organic polymers, or combinations thereof. Preferably they are fibrous glass reinforcing mats. A suitable glass mat is a woven glass roving but, preferably, the mat is formed so as to have substantial unidirectional strength. Unidirectional strength mats suitable for the present invention are described in U.S. Pat. No. 4,508,770. Exemplary of such unidirectional mats are mats with unidirectionally oriented glass fibers which are held in position by cross weaving, or throws, of polypropylene fiber or polyethylene terephthalate fibers. Of course, the mat can be formed substantially exclusively of organic fibers such as of high strength polypropylene and high strength polyester fibers. Suitably they can also be knitted. When unidirectional mats are employed the direction of maximum strength will be oriented normal to the length of the crack area being repaired.

After the road repair membrane has been applied to the old distressed road surface, and the overlay of asphaltic concrete has been applied, the high modulus binder-mat combination reinforces the distressed old road surface and significantly minimizes the propagation of cracks in the road surface by the beam strength and tensile strength of the high modulus impregnated mat. Thus, full advantage is taken of the high tensile characteristics of the impregnated fiberglass or polymeric mat to prevent widening or lengthening of a crack in the old road surface when subjected to either a thermal load or a traffic load or both. The low modulus binder layer operates in an entirely different fashion to provide a slip plane between the newly applied overlay and the reinforcing beam provided by the high modulus binder-mat combination. Thus, the newly applied overlay can move in response to both thermal and traffic loads relative to the reinforced old distressed road surface by virtue of the low modulus binder layer.

While the preferred low modulus and high modulus of elasticity binders will be subsequently discussed, suitable binders are asphaltic based materials and suitably modified asphalt compositions, especially polymer modified asphalts, like polymer asphalt blends. A wide variety of asphalts may be employed, for example, vacuum distillation bottoms, including fluxes and paving grade compositions, roofing grade asphalts and solvent extracted asphalts. Modifiers preferably include any of a wide variety of rubbery polymers, or elastomers, including natural and synthetic rubber compositions. Preferred are styrene-butadiene copolymers. Various other modifiers include ethylene-vinyl acetate copolymers, polyolefins and waxes.

LOW MODULUS BINDERS

The preferred low modulus asphaltic based binders of the present invention are hot melted blends of asphalt with rubbery polymers. Desirably the blends have the following general formulation:

TABLE 1

| Ingredient | Weight % |
|---|---|
| Asphalt | 80-90% |
| Elastomer[1] | 10-20% |

([1]including up to about 30% based on elastomer weight of an extender oil)

The preferred elastomers employed in the present composition are block copolymers of the configuration A-B-A or A-B where the blocks A are thermoplastic, non-elastomeric monoalkenyl arene polymer blocks and the B blocks are elastomeric conjugated diene-polymer blocks. The number of blocks in the block copolymer is not of special importance and the macromolecular configuration may be linear, graft, radial or star depending upon the method by which the block copolymer is formed. The elastomer may include an extender oil, such as a napthenic oil.

The preferred monoalkenyl arene is styrene. Other useful monoalkenyl arenes from which the thermoplastic (non-elastomeric) blocks may be formed include alphamethyl styrene, tert-butyl styrene and other ring alkylated styrenes as well as mixtures of the same.

The conjugated diene monomer preferably has 4 to 5 carbon atoms, such as butadiene and isoprene. The preferred conjugated diene is butadiene.

The average molecular weights of each of the blocks may be varied as desired. The monoalkenyl arene polymer blocks preferably have average molecular weights between about 5,000 and about 125,000, more preferably between about 7,000 and about 50,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 10% and about 30% by weight, the balance being the elastomeric conjugated diene blocks.

The general type and preparation of these block copolymers are described in U.S. Pat. No. RE 28,236 and in many other U.S. and foreign patents, e.g., U.S. Pat. Nos. 3,265,765: 3,281,383 and 3,639,521.

The elastomer preferably is a block copolymer of a styrene and a conjugated, diene. The styrene-diene block copolymer may be of linear, or radial, configuration, and mixtures of copolymers of different configuration, e.g., linear and radial block copolymer mixtures or mixtures of different linear or different radial block copolymers, can be utilized. At least a portion of the copolymer, especially with a linear copolymer, may include a processing oil to help ensure elastomer-asphalt compatibility, to reduce the hot viscosity of the blend, and to improve its low temperature flexing characteristics. Thus, when the elastomer is listed this elastomer is envisioned as containing minor, say 30% or less, based on the elastomer, compatibility improving amounts of a processing oil.

One presently preferred elastomer is an A-B-A linear block copolymer of a monovinyl aromatic hydrocarbon and a conjugated diene, such as copolymers in which the A blocks are styrene and the B blocks are butadiene. Another presently preferred elastomer is a radial block copolymer in which the A blocks are styrene and the B blocks are butadiene. Where the block copolymers are formed by linking or grafting diblock copolymers, some residual diblock component may remain in the final elastomer. Suitable materials are commercially available under the names "Kraton", from Shell Chemical Company, Houston, Texas, and "Finaprene", from Cogsden Oil & Chemical Co. of Dallas, Texas.

Particularly preferred elastomers include Kraton 1116 which is a radial or star configured styrene-butadiene block copolymer having a styrene/butadiene ratio of 21/79, a molecular weight of about 200,000 to about 217,000. Because of the manufacturing process this material may contain some, e.g. up to 20% residual linear diblock polymer. A preferred linear block copolymer is Kraton 1101 which is a linear triblock copolymer of styrene-butadiene-styrene which may also contain some, e.g. up to about 20% residual diblock, and having a styrene/butadiene ratio of 30/70 and a nominal molecular weight of about 100,000. Kraton 4141 can also be used, which is Kraton 1101 block copolymer containing some, typically up to about 29%, naphthenic processing oil.

The preferred asphalts for use in the low modulus binders of the present invention are unblown asphalts such as the asphalt sold by Trumbull Division of Owens-Corning Fiberglas Corporation as DT4200 asphalt. This asphalt has a penetration value at 77° F. of about 55 to about 65, a softening point of from about 125° to about 135° F., and a viscosity at 270° F. of about 6,000 cps. Other quite suitable asphalts will have penetrations at 77° F. ranging from about 50 to about 250, and softening points of from about 90° F. to about 150° F.

Highly preferred specific low modulus binders of the present invention are set forth in Table II.

TABLE II

| Ingredient | Weight % Blend 1 | Weight % Blend 2 |
|---|---|---|
| Asphalt | 89.5 | 86.9 |
| Radial Block Copolymer (Kraton 1116) | 6.9 | — |
| Linear Block Copolymer (Kraton 1101) | — | 5.8 |
| Linear Block Copolymer (Kraton 4141) | 3.6 | 7.2 |
| Viscosity at 380° F. | 1530 cps | 1562 cps |
| Recovery | 95% | 93% |
| Softening Point | 103° C. | 110° C. |
| Penetration (77° F.) | 33 | 33 |
| Low Temperature Flex | −15° F. | −15° F. |

The high modulus of elasticity binders are simply those that have a higher modulus of elasticity than that of the low modulus binder. Difficulties may be encountered in measuring some of the moduli at the same testing speed but in general it may be stated that desirable results will be obtained when the modulus of elasticity of the high modulus of elasticity binder. (as measured by ASTM D638-84 at a testing speed of 1 inch per minute) is at least about 20% greater than the modulus of elasticity of the low modulus material (using the same ASTM test but a testing speed of 2 inches per minute) with the respective moduli being either measured at, or normalized to, a temperature of −10° F. for that ratio comparison.

HIGH MODULUS BINDERS

Desirably the high modulus binders will be formulated from an asphalt and an ethylene copolymer.

Highly preferred high modulus binders of the present invention will have the general formulations of Table III:

TABLE III

| Ingredient | Weight % |
|---|---|
| Asphalt (solvent extracted) | 50–80 |
| Ethylene/Vinyl Acetate Copolymer | 2–30 |

TABLE III-continued

| Ingredient | Weight % |
|---|---|
| Wax | 7-30 |
| Elastomer | 0-12 |
| Polyeolefin Resin | 0-10 |

Solvent extraction techniques are well-known in the art and typically employ the use of a $C_3$-$C_5$ alkane usually propane. These techniques are variously referred to in the art as deasphalting or as producing propane extracted asphalt (PEA) or a propane washed asphalt (PWA) or a propane deasphalted asphalt (PDA). Typically such techniques involve the treating of normal crude oil and/or vacuum residue feedstock with such alkanes whereby a treated asphalt is obtained in which the general level of saturates, compared to the originally treated material, is decreased and the amount of asphaltenes is generally increased. Such PWA materials are relatively inexpensive because the materials essentially occur as the residual by-product of processes which are intended to extract the higher value resin and oil portions of the asphalt source. Typically, the propane-extracted asphalts are very hard.

Exemplary of the solvent extracted asphalts or propane washed asphalts which will be found suitable for making the high modulus binder, are those available from Atlas Refining, Cenex Refining and those available from Sun Oil Company under their trade designation Monar. Such propane asphalts will contain asphaltenes generally in an amount of about 0.2% to about 25 or 26% by weight and typically between about 20 and 26%. The saturates will vary between about 1 or 2% up to about 9 or 10% usually about 7-10%, the benzene aromatics will vary between about 23 to about 39 or 40% by weight, usually 33-40% and the polar aromatics will be between about 35% to about 50% by weight (all based on Corbett analysis as published in Analytical Chemistry, volume 41, No. 4, 1969, pages 576-579.

The ethylene/vinyl acetate copolymers employed herein are well known to those skilled in the art and are commercially available under the trade name "Elvax" from the E. I. duPont de Nemours Company, and are also available from USI Chemicals under the trade designations "Ultrathene" and "Vynathene". The amount of vinyl acetate present in these copolymers may vary over wide ranges but is generally preferred to employ such copolymers wherein the vinyl acetate is present in an amount of about 9 to about 60% by weight. Especially fine results have been obtained by employing vinyl acetate contents in the range of about 24 to about 42% by weight.

Two specifically preferred ethylene/vinyl acetate (EVA) copolymers are Elvax 40-W having a vinyl acetate content of about 40% by weight and a melt index of 57 (ASTM D1238) and as Elvax 350 having a vinyl acetate content of about 24.3 to about 25.7 and a melt index of from about 17.3 to about 20.9.

While a wide variety of waxes may be employed, especially suitable waxes for use in the high modulus binder formulation include microcrystalline petroleum waxes having acid numbers generally in the range of about 5 to about 50 and melting points generally in the range of about 190°-225° F. (88°-107° C.). The wax material promotes compatibility between the other constituents. This compatibility can be easily checked by simply blending the ingredients at an elevated temperature and then casting films therefrom. Compatibility will be indicated by the films exhibiting a homogeneous substantially single phase characteristic.

Suitable waxes include the microcrystalline petroleum waxes both oxidized and unoxidized. Representative commercially available waxes include Cardis 320 wax available from Bareco Division of Petrolite Corporation, Tulsa, Oklahoma and have a melting point of about 193° F. and a penetration of about 10 (77° F.); Shellwax 300 wax available from Shell Chemical Company of Houston, Texas, having a melting point of about 150° F. and a penetration of about 13 (77° F.): and 180M wax available from Witco Chemical Co.

The preferred polyolefin resin is polyethylene. An especially suitable polyethylene is available from USI Chemicals as Petrothene 601.

Especially suitable elastomers include block copolymers of styrene and a conjugated diene, as above disclosed. A radial block copolymer such as Finaprene 416, a styrene-butadiene block copolymer having a styrene/butadiene ratio of 30/70 and a molecular weight of about 160,000 is particularly preferred.

Highly preferred specific high modulus binders as contemplated by the present invention include the blends set forth in Table IV:

TABLE IV

| Ingredient | Weight % | | |
|---|---|---|---|
| | Blend 1 | Blend 2 | Blend 3 |
| Asphalt | 55 (Cenex PWA) | 60 (Atlas PWA) | 74.1 (Monar PWA) |
| Elvax 40-W | 20 | | |
| Elvax 350 | | 20 | 3.7 |
| Cardis 320 Wax | 25 | | |
| Shellwax 300 | | 20 | |
| Finaprene 416 | | | 7.4 |
| Polyethylene | | | 4.9 |
| Witco 180M Wax | | | 9.9 |

It can be seen that the highly preferred high modulus binders comprise (1) blends of asphalt, ethylene/vinyl acetate and wax or (2) blends of asphalt, ethylene/vinyl acetate, wax, a block copolymer, and polyethylene.

Type 1 blends preferably will be of the Table V compositions:

TABLE V

| PWA Asphalt | 50-65% by weight |
|---|---|
| Ethylene/Vinyl Acetate | 15-30% by weight |
| Wax | 15-30% by weight |

Type 2 blends preferably will be of the Table VI compositions:

TABLE VI

| PWA Asphalt | 65-80% by weight |
|---|---|
| Ethylene/Vinyl Acetate | 2-6% by weight |
| Wax | 7-13% by weight |
| Block Copolymer | 2-12% by weight |
| Polyethylene | 3-10% by weight |

Generally it may be stated that neither the high modulus of elasticity formulation nor the low modulus of elasticity formulation would be considered as pressure sensitive adhesives notwithstanding the fact that they do indeed possess some degree of tack and stickiness.

Based on simulated testing, data was developed to forecast the performance of membranes when used to repair distressed roads. This testing is based on distressed, unrepaired road deflections obtained using a load limit of 18 KIP at 70° F. This simulation was based upon, first of all, employing Blend 3 of Table IV as the high modulus binder which would first be applied in a molten condition onto the distressed concrete. A mat having primarily unidirectional strength from glass fibers held by a cross throw of a polymeric fiber was used as a reinforcement fiber. The present invention contemplates applying such a mat onto the applied molten high modulus binder so as to impregnate the mat. This testing is also based upon applying a final layer of the low modulus of elasticity binder of the formulations set forth in Table II, Blend 1.

In comparative simulated testing the prior art was used as a reference point. The prior art differed in that instead of applying two separate binders as contemplated in the present invention, (i.e., first of all, the high modulus impregnant binder following by the embedding therein of the mat, cooling and then overcoating with the low modulus binder) the low modulus binder was employed in both instances namely as the impregnant layer and then as the overcoat layer. The composition was also that of Table II Blend 1.

Figure 1:
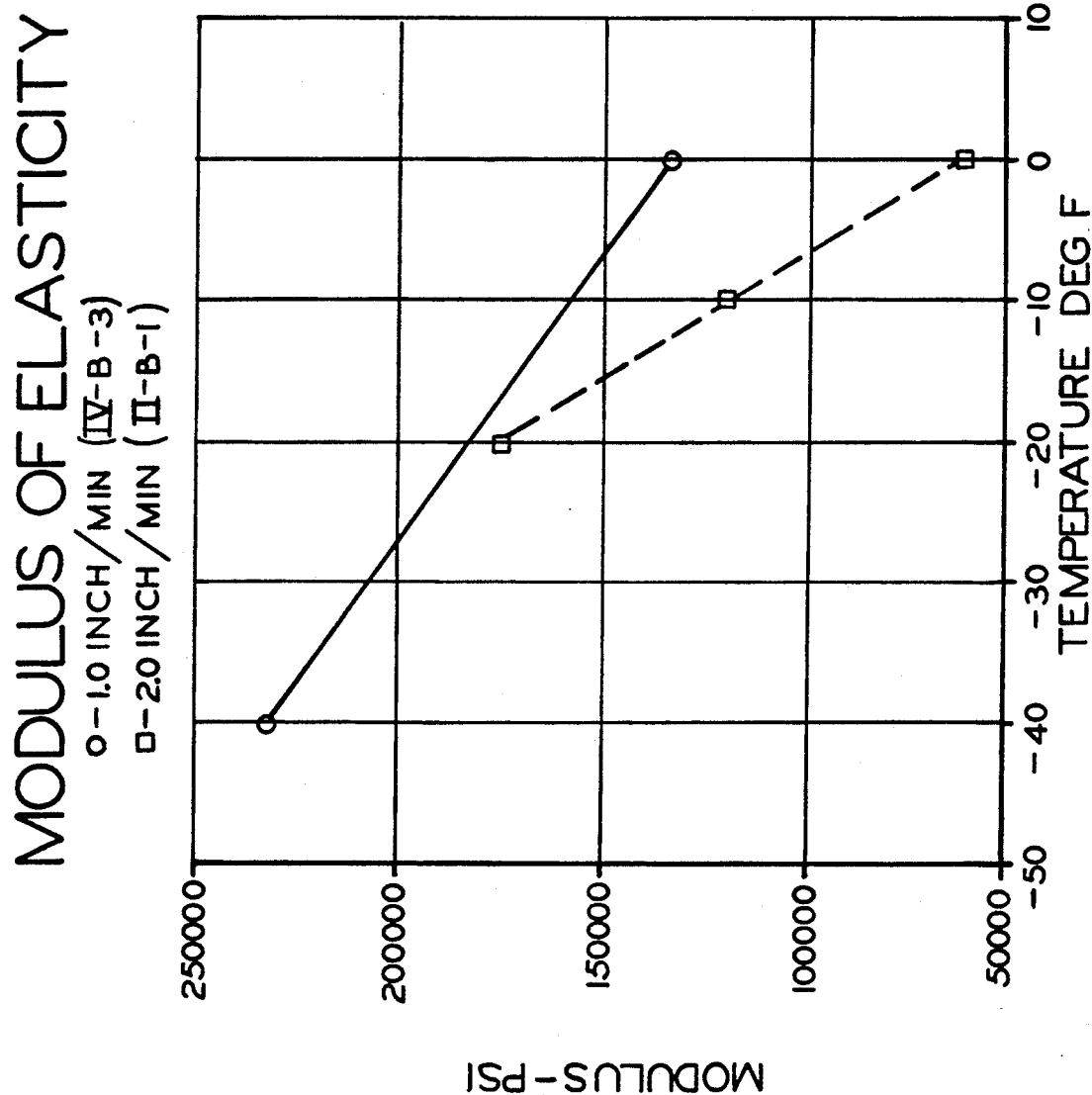
FIG. 1 plots the modulus of elasticity for both the high modulus binder (IV-13-3) and that of the low modulus binder (II-B-1). The moduli were measured employing ASTM D638-84.

Referring to the drawing, the modulus of elasticity for both the above high modulus binder (IV-B-3) and that of the above low modulus binder (II-B-1) are set forth. The moduli were measured employing ASTM D638-84 but it will be observed that the modulus for the low modulus of elasticity binder was measured at a rate of 2 inches per minute whereas the modulus for the high modulus of elasticity material was measured at a rate of 1 inch per minute. The reason for this is that the equipment was incapable of handling the modulus of elasticity measurement for high modulus material when a rate of 2 inches per minute was employed. The modulus was simply too high for the equipment. It will be observed that at about −10° F. the ratio of the modulus of elasticity of the high modulus to the low modulus based on the measurements indicated above was about 1.3.

Tables VII and VIII below summarize projected performance features.

TABLE VII

Projected Minimum Tolerable Temperature for Overlay of Specified Thickness

| Reinforcement | Binder System | Temperature/ (Overlay Thickness) | Temperature/ (Overlay Thickness) |
|---|---|---|---|
| None | None | +5° F./1" | −10° F./2" |
| Unidirectional Mat | Table II Blend 1 (Prior Art) | −10° F./1" | −25° F./2" |
| Unidirectional Mat | Table II Blend 1 Overcoat & Table IV Blend 3 Impregnant | −20°F./1" | −35° F./2" |

TABLE VIII

Projected Maximum Pre-Repair Deflection for Equivalent Overlay Performance at Specified Temperature

| Reinforcement | Binder System | Deflection/ Temperature (1" Overlay) | Deflection/ Temperature (2" Overlay) |
|---|---|---|---|
| None | None | .04/10° F. | 0.06/0° F. |
| Unidirectional Mat | Table II Blend 1 (Prior Art) | 0.18/10° F. | 0.23/0° F. |
| Unidirectional Mat | Table II Blend 1 Overcoat & Table IV Blend 3 Impregnant | 0.38/10° F. | 1.1/0° F. |

Referring to Table VII, it will be seen that when no reinforcement is employed and no binder system is employed the projected lowest tolerable temperature for an overlay is a +5° F. with a 1" overlay and a −10° F. with a 2" overlay. In contrast, the prior art of using the same binder as an impregnant and overcoat, for example, the binder of Table II, Blend 1 with the unidirectional mat, produces a minimum temperature of a −10° F. for 1" overlay and a −25° F. for a 2" overlay. In marked contrast, the present invention provides for a tolerable temperature of a −20° F. with only a 1" final hot mix asphalt overlay and a temperature of −35° F. with a 2" overlay. Those skilled in the art will immediately recognize the significance of such unexpected improvement in performance.

In Table VIII, it will be noted that there are two columns one for a 1" overlay and the other for a 2" overlay with specified deflections and temperatures. Generally the deflection refers to the amount of deflection in the road, prior to repair, using a simulated 18 KIP load at 70° F. The higher the number for deflection the more severely distressed is the road. Consequently, in Table VIII, at a given temperature for a given overlay thickness the higher the deflection value, the better is the performance of the repair. Referring to Table VIII it will be seen that when no reinforcement and no binder system is employed, at a temperature of 10° F. satisfactory performance with a 141 overlay would be obtained provided the initial unrepaired road deflection is only 0.04. In contrast, when only the Table II Blend 1 binder system is used with a reinforcement, equivalent performance would be anticipated if the deflection were 0.18. In even more marked contrast is the value of the present invention wherein equivalent performance would be anticipated at 10° F. if the deflection were as high as 0.38. Similarly note, with a 2" overlay and at an anticipated temperature of 0° F. satisfactory performance would be anticipated with the present invention if the initial deflection was 1.1, whereas without any reinforcement or binder such performance could only be obtained if the deflection were 0.06 and, if the same binder is employed, when the deflection was only 0.23. Again those skilled in the art will readily appreciate the significance of these projected performances.

COMMERCIAL EXPLOITATION

As will be apparent from the above, the present invention is best commercially exploited by applying, in a molten condition, a high modulus of elasticity binder onto the distressed concrete. Before the binder has set up a reinforcing mat, preferably a fibrous reinforcing mat, is embedded into the molten high modulus binder in order to impregnate the mat and the binder is then allowed to cool. If desired, an additional application of the high modulus material can then be made to further ensure impregnation. Finally, after cooling, a molten low modulus of elasticity binder is applied as an overcoat and allowed to cool. The formed membrane is then overlaid with a conventional hot mix asphalt overlay and will result in a significant decrease in the reflective cracking.

While the above describes the present invention, it will, of course, be apparent that modifications are possible which pursuant to the patent statutes and laws do not depart from the spirit and scope thereof.

We claim:

1. A repaired composite roadway comprising distressed pavement, an asphaltic concrete overlay and an intermediate multi-ply laminate applied to the distressed pavement to minimize the propagation of the cracks into said asphaltic concrete overlay, said laminate comprising:
   (a) a first ply of a first asphalt-polymer blend adhered to the distressed pavement and having a relatively high modulus of elasticity, said first ply including a permeable mat having open interstices permeated by said first blend; and
   (b) a second ply of a second asphalt-polymer blend different from said first blend, said second blend being adhered to said permeated mat and in contact with said overlay, said second blend having a modulus of elasticity substantially less than that of the first blend and the first and second plies in combination being adapted to to inhibit enlargement of any cracks in the distressed pavement as the road is subjected to thermal and traffic stress.

2. A multi-ply laminate as defined in claim 1, wherein the first blend comprises a blend of solvent extracted asphalt, ethylene/vinyl acetate copolymer, wax, block copolymer of styrene and a conjugated diene and polyolefin.

3. The laminate of claim 2 wherein said first blend consists essentially of propane washed asphalt, ethylene/vinyl acetate copolymer and wax.

4. The laminate of claim 2 wherein said first blend consists essentially of propane washed asphalt, ethylene/vinyl acetate copolymer, wax, styrene-butadiene block copolymer and polyethylene.

5. A multi-ply laminate as defined in claim 2 wherein the second blend comprises a blend of asphalt, block copolymer of styrene and a conjugated diene.

6. A multi-ply laminate as defined in claim 5, wherein said mat comprises a glass fiber mat.

7. A repaired, laminated roadway comprising an asphaltic concrete overlay, a base roadway characterized by a distressed pavement having cracks therein, and an interposed multi-ply membrane for retarding reflective cracking, comprising:
   (a) a first ply of polymer modified asphalt material having a relatively high modulus of elasticity;
   (b) a permeable mat providing a medial ply and impregnated with the material of the first ply; and
   (c) a third ply of a polymer modified asphalt material laminated to said impregnated mat, the third ply material being different from the material of the first ply and having a modulus of elasticity less than that of the first ply material; and first and second plies in combination being relatively inflexible and said first ply being disposed adjacent the distressed pavement and said third ply adjacent said overlay, whereby said membrane reinforces the roadway to retard enlargement of any distressed pavement cracks as the road is subjected to thermal and traffic stresses, and the lower modulus material of the third ply accommodating relative movement between the asphaltic concrete overlay and the distressed pavement as the roadway is subjected to thermal and traffic stresses.

8. A laminated repaired roadway adapted for retarding reflective cracking comprising a distressed pavement, an asphaltic concrete overlay applied to a distressed pavement, and an intermediate member comprising:
   (a) a fibrous reinforcing mat impregnated with a molten polymer modified asphalt material having a relatively high modulus of elasticity when solidified, the impregnated mat being adherent to the distressed pavement to retard enlargement of cracks covered by the mat as the roadway is subjected to thermal and traffic stresses; and
   (b) a separate and distinct layer of polymer modified asphalt material overlaying said impregnated mat, said separate layer being of a modulus of elasticity substantially less than that of the material impregnating the mat, said separate layer accommodating movement of the overlay relative to the impregnated mat as the roadway is subjected to thermal and traffic stresses.

9. In a composite roadway having a distressed pavement, an asphaltic concrete overlay, and an interposed membrane between the pavement and the overlay, the improvement wherein said membrane comprises:
   (a) a reinforcing mat impregnated with an asphaltic based first binder, said binder being in contact with said pavement, and
   (b) a separate layer of an asphaltic based second binder attached to the first binder of said impregnated mat and of substantially lower modulus of elasticity than said first binder, said second binder being in contact with said overlay.

10. The composite roadway of claim 9 wherein said first binder consists essentially of propane washed asphalt, ethylene/vinyl acetate copolymer, and wax.

11. The composite roadway of claim 9 wherein said first blend consists essentially of propane washed asphalt, ethylene/vinyl acetate copolymer, wax, styrene-butadiene copolymer and polyethylene.

12. The composite roadway of claim 9 wherein based on a value at $-10°$ F. as determined by ASTM D638-84 the ratio of the modulus of elasticity of said first binder (measured at a rate of 1 inch per minute) to the modulus of elasticity of the low modulus binder (measured at a rate of 2 inches per minute) is about at least 1.3.

13. The composite roadway of claim 9 wherein said first binder comprises, solvent extracted asphalt, ethylene/vinyl acetate copolymer, wax, block copolymer of styrene and a conjugated diene and polyolefin.

14. The composite roadway of claim 13 wherein said second binder comprises, asphalt, block copolymer of styrene and a conjugated diene.

* * * * *